(No Model.)

J. P. HOWE.
COMBINED CULTIVATOR AND HARROW.

No. 281,221. Patented July 10, 1883.

Witnesses:
James Henderson
Lemuel H. Hodgman

Inventor:
J. P. Howe
by D. L. Berbe
Atty

UNITED STATES PATENT OFFICE.

JOHN P. HOWE, OF CHEROKEE, IOWA.

COMBINED CULTIVATOR AND HARROW.

SPECIFICATION forming part of Letters Patent No. 281,221, dated July 10, 1883.

Application filed June 6, 1882. (No model.)

*To all whom it may concern:*

Be it known that I, JOHN P. HOWE, of Cherokee, in the county of Cherokee and State of Iowa, have invented a new and useful Improvement in Combined Cultivator and Harrow, which improvement is fully set forth in the following specification and accompanying drawings, in which—

Figure 1:
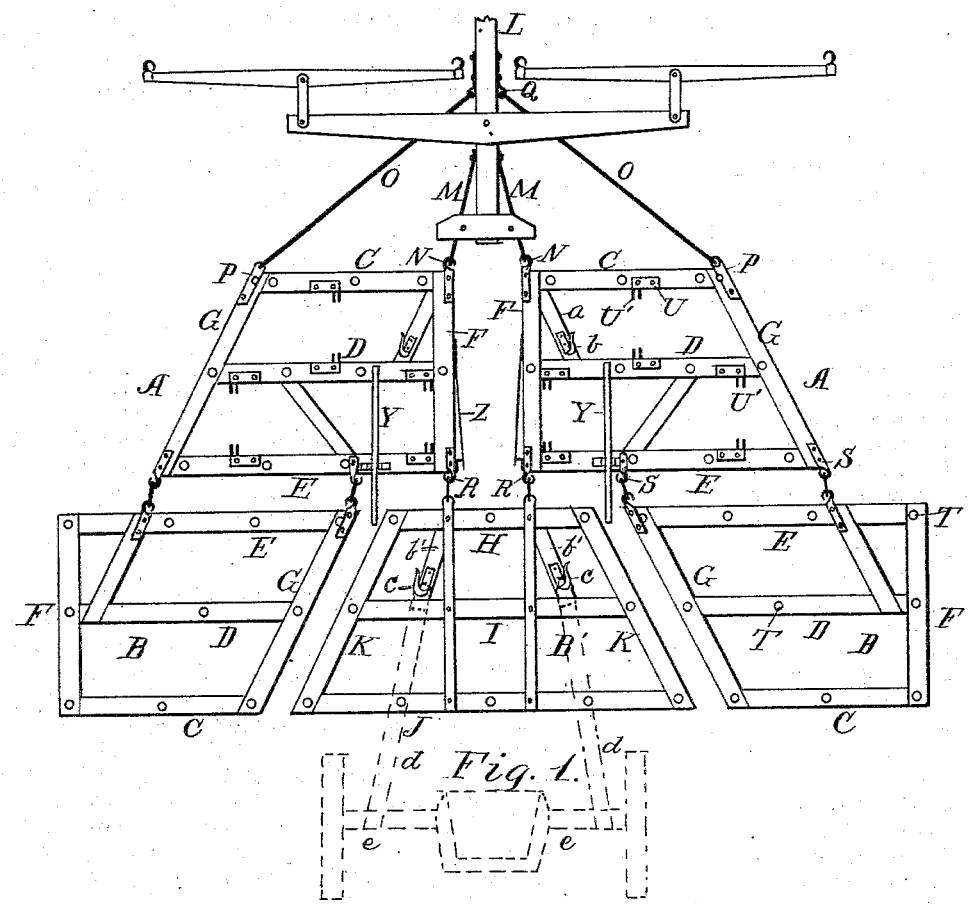
Figure 2:
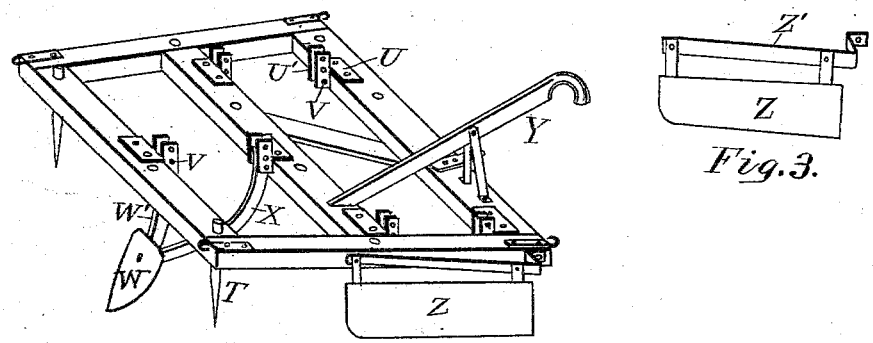
Figure 3:
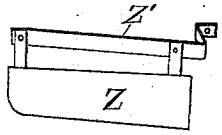

Figure 1 is a top or plan view of the combined harrow and cultivator. Fig. 2 is a perspective view of one of the forward sections which constitute the cultivator, and Fig. 3 is a perspective view of the fender for the cultivator-sections.

The object of my invention is to provide a combined cultivator and harrow; and it consists in having the harrow formed of five sections hinged together, the two forward sections of which, when detached from the three rear sections, serve as cultivator-frames, to which are attached peculiarly-formed detachable shovels, all of which will now be shown in detail.

In the accompanying drawings, A A represent the forward or cultivator sections, and B B B' the rear harrow-sections. The forward sections, A A, and the two outer rear sections are preferably made the same shape or form, which consist of three parallel cross-beams, C D E, united at one end by the end piece or beam, F, and at the opposite ends by an angling beam, G. The two forward sections, A A, have the right-angled side pieces F next to each other, and the two rear outer sections have their angling side pieces G G next to each other, so that their forward ends converge toward each other, but permitting space between for the central rear section, B'. This central section has also three cross-beams, H I J, united at the ends by beams K, whose forward ends converge toward each other at angles equal to the converging beams G of the sections A B.

The tongue L is provided at the rear end with two branching draft or stay rods, M, having eyes or hooks at the rear ends, which are attached to the hooks or eyes N at the inner forward corners of the sections A A.

At a point forward of the stay-rods M are two similar branching stay or draft rods, O, which project backward, and are also provided with eyes or hooks, which are attached to the hooks or eyes P on the outer forward corners of the forward sections, A. The forward ends of the rods O are attached to the tongue by means of hooks or loops Q, so that the outer sides of the sections A are permitted to have a limited vertical play to provide for the inequalities of the ground. The rear ends of the sections A are each provided with three hooks or loops, to the two inner ones, R, of which the central rear section, B', is attached, and the rear side sections, B B, are attached to the other hooks or loops, S S. It will be observed, therefore, that while the rear sections are united to the forward sections, they are flexible, and will readily yield to the unevenness of the ground. The rear sections, B B', are provided with teeth T at suitable intervals, and the forward sections are also similarly equipped.

The cross-beams of the forward sections are each provided with one or more plates, U, having projecting over the side of the beam two ears, U'. These plates are so located that the ears, U', on one beam are directly forward or back of the ears on the next beam. These ears have a series of holes, V. To these ears are attached the shovels W. Each shovel has a vertically-disposed stem, W', and a rearwardly upwardly curved brace, X. The stem and brace are both provided at the ends with holes, so that when the stem W' is placed between the ears V in the forward beams, and the brace X between the ears in the next beam to the rear, pins may be placed through the holes in the ears to secure the shovel in position. It is obvious that by this arrangement the shovel may be raised or lowered or adjusted at any angle. Each of the forward sections is provided with a rearwardly-projecting handle, Y.

On the inner sides of the forward sections is placed a shield, Z, attached thereto by means of a bar, Z, which has an L-shaped rear end, so as to remove the rear end of the shield from the side bar F a limited distance. The object and use of the shield is to prevent the soil in cultivating from being thrown against or over onto the crop.

In operation as a harrow, the sections are united as shown in Fig. 1, and the cultivator-shovels removed. When designed as a cultivator, the rear sections are detached and only the two forward sections used, with the shovels W attached. The handles Y are then in proper position to be manipulated by the operator.

To the harrow and cultivator thus constructed and arranged I have provided a riding attachment, which can be used at all times or detached, as desired.

To each of the forward sections I attach a brace or beam, a, on the rear end of which is a hook, b. To the rear central section, B', I also attach two braces, b', provided similarly with hooks c c. To these hooks are attached the forward ends of the pieces d d, (dotted lines,) which connect with the truck e. This truck has a suitable seat for the driver, and may be used either with the forward sections, A A, when used as a cultivator, or with the rear sections when used as a harrow.

What I claim is—

1. In a combined cultivator and harrow, the forward sections, A, having the plates U, provided with ears U', in combination with the plow or shovel W, having the stem W' and the curved brace X, substantially as and for the purposes set forth.

2. The two forward sections, A A, separately connected with the tongue L, in combination with the three rear sections, B B' B, each of which is hinged to the two forward sections, substantially as herein set forth.

In testimony that I claim the foregoing I have hereunto set my hand, this 29th day of May, 1882, in the presence of witnesses.

JOHN P. HOWE.

Witnesses:
JAMES HENDERSON,
LEMUEL H. HOSTMAN.